(12) United States Patent
Jang et al.

(10) Patent No.: US 10,543,754 B2
(45) Date of Patent: Jan. 28, 2020

(54) CHARGING CONTROL APPARATUS AND METHOD FOR ELECTRIC VEHICLE AND BILLING SYSTEM USING THE SAME

(71) Applicants: Hyundai Motor Company, Seoul (KR); Kia Motors Corporation, Seoul (KR)

(72) Inventors: Jin Su Jang, Hwaseong-si (KR); Jae Yong Seong, Hwaseong-si (KR); Taek Hyun Jung, Hwaseong-si (KR); Zeung Il Kim, Hwaseong-si (KR); Ho Jin Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 164 days.

(21) Appl. No.: 15/636,293

(22) Filed: Jun. 28, 2017

(65) Prior Publication Data

US 2018/0009325 A1   Jan. 11, 2018

(30) Foreign Application Priority Data

Jul. 5, 2016   (KR) .................. 10-2016-0084915
Jun. 5, 2017   (KR) .................. 10-2017-0069710

(51) Int. Cl.
*H02J 7/00* (2006.01)
*B60L 11/18* (2006.01)
(Continued)

(52) U.S. Cl.
CPC .......... *B60L 11/1838* (2013.01); *B60L 53/30* (2019.02); *B60L 53/305* (2019.02); *B60L 53/35* (2019.02); *B60L 53/60* (2019.02); *B60L 53/65* (2019.02); *B60L 53/665* (2019.02); *H02J 7/0021* (2013.01); *H02J 7/0027* (2013.01); *H02J 7/0045* (2013.01); *H02J 7/025* (2013.01); *H02J 50/80* (2016.02); *H04W 76/10* (2018.02);
(Continued)

(58) Field of Classification Search
CPC ................. B60L 11/1838; H02J 50/80; H02J 2007/0001
USPC ....................................... 320/106
See application file for complete search history.

(56) References Cited

U.S. PATENT DOCUMENTS

2009/0210357 A1   8/2009   Pudar et al.
2013/0029595 A1*  1/2013   Widmer ............... H04B 5/0031
                                                     455/39

(Continued)

FOREIGN PATENT DOCUMENTS

EP         3 017 994 A2     5/2016

*Primary Examiner* — Suchin Parihar
(74) *Attorney, Agent, or Firm* — Morgan, Lewis & Bockius LLP

(57) ABSTRACT

An EV charging control apparatus may include a controller receiving a charging approval message for an EV from a charging management server, starting a charging to the EV in response to the charging approval message, measuring and accumulating an amount of energy charged to the EV, recognizing a charging termination operation from a user of the EV or the EV, and deriving charging information based on the amount of energy charged in response to the charging termination operation, and a short-range wireless communication module establishing a connection with a short-range wireless communication module mounted on the EV, and transmitting the charging information to the EV.

15 Claims, 9 Drawing Sheets

(51) Int. Cl.
*H04W 76/10* (2018.01)
*H02J 7/02* (2016.01)
*H02J 50/80* (2016.01)
*B60L 53/30* (2019.01)
*B60L 53/65* (2019.01)
*B60L 53/60* (2019.01)
*B60L 53/66* (2019.01)
*B60L 53/35* (2019.01)
*H04W 4/80* (2018.01)
*H04W 84/12* (2009.01)

(52) U.S. Cl.
CPC .................. *H02J 2007/0001* (2013.01); *H02J 2007/0096* (2013.01); *H04W 4/80* (2018.02); *H04W 84/12* (2013.01); *Y02T 10/7005* (2013.01); *Y02T 10/7055* (2013.01); *Y02T 10/7072* (2013.01); *Y02T 90/121* (2013.01); *Y02T 90/125* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 30/12* (2013.01); *Y04S 30/14* (2013.01)

(56) References Cited

U.S. PATENT DOCUMENTS

2013/0200718 A1* 8/2013 Ogawa .................... B60L 5/005
                                                                  307/104
2016/0089989 A1    3/2016 Park

* cited by examiner

CHARGING CONTROL APPARATUS AND METHOD FOR ELECTRIC VEHICLE AND BILLING SYSTEM USING THE SAME

CROSS-REFERENCE TO RELATED APPLICATION

The present application claims priority to Korean Patent Applications No. 10-2016-0084915 filed on Jul. 5, 2016 and No. 10-2017-0069710 filed on Jun. 5, 2017, the entire contents of which is incorporated herein for all purposes by this reference.

BACKGROUND OF THE INVENTION

Field of the Invention

The present invention relates to electric vehicle (EV) charging control apparatus, EV charging control method, and a billing system using the same, and more particularly, to EV charging control apparatus and method for effectively performing billing of the EV charging, an EV for the same, a charging management server for the same, and a billing system using these.

Description of Related Art

An electric vehicle (EV) charging system may basically be defined as a system for charging a high-voltage battery mounted on an EV by using power of an energy storage device or a power grid of a commercial power source. Such the EV charging system may have various forms according to the type of EV. For example, the EV charging system may be classified into a conductive charging type using a charging cable and a non-contact wireless power transfer (WPT) type (also referred to as an 'inductive charging type').

In the case of inductive charging using a WPT system, when it is necessary to charge the high-voltage battery mounted on the EV, the EV may move to a ground assembly (GA) located in a charging station or a charging spot capable of EV charging.

When charging the EV, a vehicle assembly (VA) (i.e., a reception pad in the VA) mounted on the EV makes an inductive resonance coupling with a transmission pad of the GA located in the charging station or the charging spot, and charges the battery in the EV using power transferred from the GA through the inductive resonance coupling.

On the other hand, the conductive charging type EV charging system may use a charging cable having a charging plug to connect an inlet of the EV to a charging stand and charge alternating current (AC) power of the charging stand to the battery of the EV through an on-board charger (OBC) of the EV. Also, the conductive charging type EV charging system may also be configured to connect the inlet of the EV with an off-board charger using a rapid charging cable having a charging plug, and charge the EV with direct current (DC) power of the off-board charger. A battery management system (BMS) of the EV may communicate with the charging stand or the off-board charger in order to charge the EV.

Meanwhile, a conventional EV charging system including the conductive charging type or the inductive charging type has to use a separate communication network only for billing for the EV charging, thereby increasing communication costs of users. In addition, a payment device or method that is used in accordance with a standard or generally used should be used for payment of the EV charging, and a separate security technology should be applied to the payment process. Thus, there is a disadvantage that equipment cost increases and a process for the billing becomes complicated.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an EV charging control apparatus exchanging charging information with an EV using a short-range wireless communication.

Embodiments of the present invention also provide an EV charging control method performed by an EV charging control apparatus exchanging charging information with an EV using a short-range wireless communication.

Embodiments of the present invention also provide a charging management server interworking with the EV charging control apparatus.

Embodiments of the present invention also provide an EV exchanging charging information with the EV charging control apparatus using a short-range wireless communication.

According to embodiments of the present invention, an electric vehicle (EV) charging control apparatus may be provided. The EV charging control apparatus may comprise a controller receiving a charging approval message for an EV from a charging management server, starting a charging to the EV in response to the charging approval message, measuring and accumulating an amount of energy charged to the EV, recognizing a charging termination operation from a user of the EV or the EV, and deriving charging information based on the amount of energy charged in response to the charging termination operation; and a short-range wireless communication module establishing a connection with a short-range wireless communication module mounted on the EV, and transmitting the charging information to the EV.

The EV charging control apparatus may be an in-cable control box (ICCB).

The EV charging control apparatus may be a transmission pad, a ground assembly (GA), or a supply equipment communication controller (SECC).

The short-range wireless communication module may communicate with the short-range wireless communication module mounted on the EV using a wireless Local Area Network (WLAN) or a Bluetooth.

The charging information may include at least one of identification information of the EV, a charging start time, a charging end time, and an amount of charged energy.

The controller may identify a position of the EV charging control apparatus or a charging station where the EV charging control apparatus is located, and transmit information on the position to the EV through the short-range wireless communication module.

The ICCB may determine whether a charging plug of the ICCB is connected to the EV or not, and transmit information on the ICCB to the EV when the charging plug of the ICCB is determined to be connected to the EV.

Furthermore, in accordance with embodiments of the present invention, an electric vehicle (EV) charging control method performed in an EV charging control apparatus may be provided. The EV charging control method may comprise receiving a charging approval message for an EV from a charging management server; starting a charging for the EV in response to the charging approval message, and accumulating and measuring an amount of energy charged to the EV; recognizing a charging termination operation from a user or the EV, and deriving charging information based on the amount of energy charged in response to the charging termination operation; and transmitting the charging information to the EV using a short-range wireless communication.

Furthermore, in accordance with embodiments of the present invention, a charging management server may comprise a processor; a storage device storing instructions executed by the processor and information on at least one charging station, at least one charging control apparatus, at least one electric vehicle (EV), and at least one user of the at least one EV; and a communication interface for communicating with a server of a communication service provider providing a communication service to a user of an EV and a server of an electric power company. Also, the instructions may be configured to receive, as connected to the EV, information on the EV, an EV charging control apparatus controlling charging to the EV, and the user of the EV through the communication interface; determine whether to approve the charging to the EV based on the received information; transmit a charging approval message to the EV when the charging to the EV is determined to be approved through the communication interface; receive charging information from the EV charging control apparatus according to a termination of the charging to the EV through the communication interface; and transmit the charging information as billing information for the charging to the EV to the server of the electric power company through the communication interface.

Furthermore, in accordance with embodiments of the present invention, an electric vehicle (EV) may comprise a charging controller receiving a charging approval message from a charging management server, transferring the charging approval message to an EV charging control apparatus, charging a battery with electric power provided through the EV charging control apparatus, and transmitting charging information received from the EV charging control apparatus according to a charging termination operation to the charging management server; and a communication module receiving the charging information from the EV charging control apparatus through short-range wireless communication, and performing data transmission and reception with a mobile communication network to which the charging management server and the communication module are connected.

The communication module includes a telematics system (TMS) transferring the charging information to the charging management server through the mobile communication network, and a short-range wireless communication module receiving the charging information from the EV charging control apparatus using a wireless Local Area Network (WLAN) or a Bluetooth.

Using the billing system for EV charging according to the above-described embodiments of the present invention, there is an advantage that an EV can be charged at a charge exclusive for an EV even in a general household.

Also, there is an advantage that the system can be efficiently constructed by use of a relatively inexpensive short-range wireless communication module including Wi-Fi, Bluetooth, etc., instead of a communication module supporting a mobile communication network.

Further, when the EV charging control apparatus and method are combined with a vehicle remote control system, user convenience and merchantability can be increased remarkably. That is, remote charging control can be effectively performed by use of a user terminal including a smart phone.

In addition, according to an exemplary embodiment of the present invention, it is made possible to use a wall outlet disposed in a general household or a public facility to charge an EV, and an EV dedicated billing service can be effectively implemented for an EV having a telematics system (TMS).

In addition, there is an advantage that the EV charging and the billing for the EV charging can be implemented by use of wireless charging standard communication protocols (e.g., SAE J2836-6, or IEC 61980-2) in a WLAN communication environment between an ICCB and the EV.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
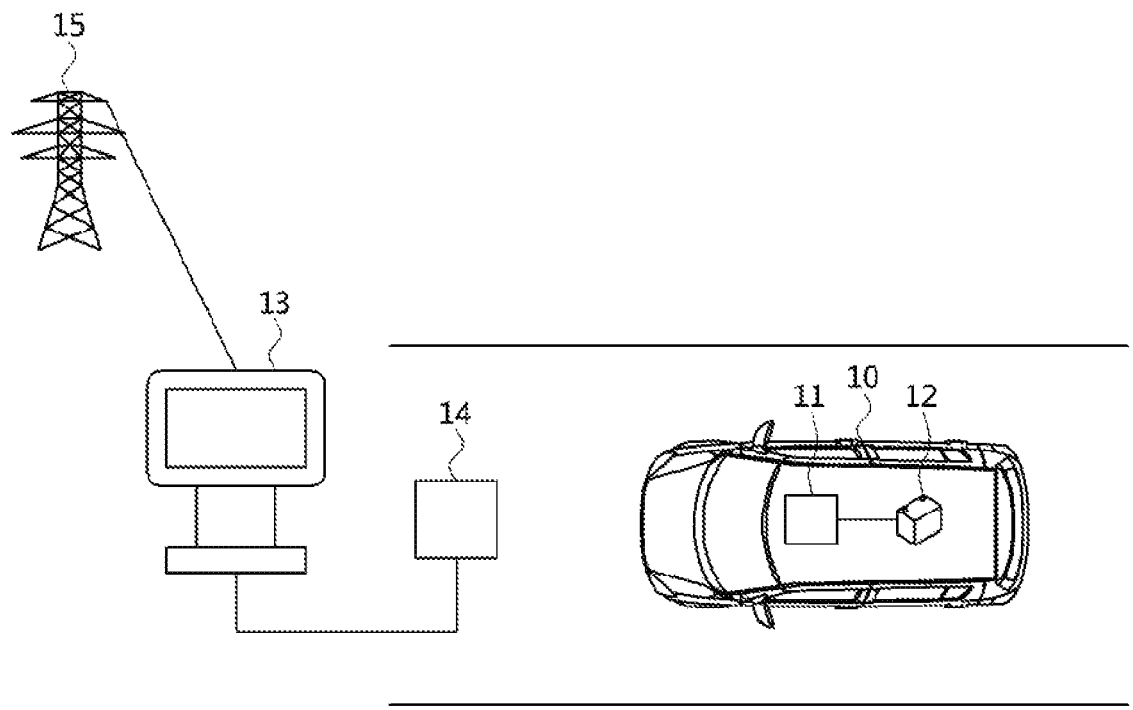
FIG. 1 is a conceptual diagram illustrating a concept of a wireless power transfer (WPT) to which an exemplary embodiment of the present invention is applied.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It will be understood that although the terms "first," "second," etc. may be used herein to describe various components, these components should not be limited by these terms. These terms are used merely to distinguish one element from another. For example, without departing from the scope of the present invention, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present invention. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Terms used in the present invention are defined as follows.

"Electric Vehicle, EV": An automobile, as defined in 49 CFR 523.3, intended for highway use, powered by an electric motor that draws current from an on-vehicle energy storage device including a battery, which is rechargeable from an off-vehicle source including residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle, PEV": An Electric Vehicle that recharges the on-vehicle primary battery by connecting to the power grid.

"Plug-in vehicle, PV": An electric vehicle rechargeable through wireless charging from an electric vehicle supply equipment (EVSE) without using a physical plug or a physical socket.

"Heavy duty vehicle; H.D. Vehicle": Any four-or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system, WCS": A system for a wireless power transfer and control between the GA and VA including alignment and communications. This system transfers energy from the electric supply network to the electric vehicle electromagnetically through a two-part loosely coupled transformer.

"Wireless power transfer, WPT": A transfer of electrical power from an AC supply network to an electric vehicle by contactless means.

"Utility": A set of systems which supply electrical energy and include a customer information system (CIS), an advanced metering infrastructure (AMI), rates and revenue system, etc. The utility may provide an EV with energy through rates table and discrete events. Also, the utility may provide information related to certification on EVs, interval of power consumption measurements, and tariff.

"Smart charging": A system in which EVSE and/or PEV communicate with power grid to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and right.

"Interoperability": A state in which component of a system interwork with corresponding components of the system to perform operations aimed by the system. Also, information interoperability may mean capability that two or more networks, systems, devices, applications, or components can efficiently share and easily use information without giving inconvenience to users.

"Inductive charging system": A system transferring energy from a power source to an EV through a two-part gapped core transformer in which the two halves of the transformer, primary and secondary coils are physically separated from one another. In the present invention, the inductive charging system may correspond to an EV power transfer system.

"Inductive coupler": A transformer formed by the coil in the GA Coil and the coil in the VA Coil that allows power to be transferred with galvanic isolation.

"Inductive coupling": Magnetic coupling between two coils. In the present invention, coupling between the GA Coil and the VA Coil.

"Ground assembly, GA'": An assembly on the infrastructure side including the GA Coil, a power/frequency conversion device and GA controller as well as the wiring from the grid and between each device, filtering circuits, housing(s) etc., necessary to function as the power source of wireless power charging system. The GA may include the communication elements necessary for communication between the GA and the VA.

"Vehicle assembly, VA": An assembly on the vehicle including the VA Coil, rectifier/power conversion device and VA controller as well as the wiring to the vehicle batteries and between each device, filtering circuits, housing(s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

"Primary device": An apparatus which provides the contactless coupling to the secondary device. That is, the primary device may be an apparatus external to an EV. When the EV is receiving power, the primary device may act as the source of the power to be transferred. The primary device may include the housing and all covers.

"Secondary device": An apparatus mounted on the EV which provides the contactless coupling to the primary device. That is, the secondary device may be disposed in the EV. When the EV is receiving power, the secondary device may transfer the power from the primary to the EV. The secondary device may include the housing and all covers.

"GA controller": A portion of the GA that regulates the output power level to the GA Coil based on information from the vehicle.

"VA controller": A portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": A vertical distance between the plane of the higher of the top portion of the litz wire or the top portion of the magnetic material in the GA Coil to the plane of the lower of the bottom portion of the litz wire or the magnetic material in the VA Coil when aligned.

"Ambient temperature": A ground-level temperature of the air measured at the subsystem under consideration and not in direct sun light.

"Vehicle ground clearance": A vertical distance between the ground surface and the lowest part of the vehicle floor pan.

"Vehicle magnetic ground clearance": A vertical distance between the plane of the lower of the bottom portion of the litz wire or the magnetic material in the VA Coil mounted on a vehicle to the ground surface.

"VA Coil magnetic surface distance": A distance between the plane of the nearest magnetic or conducting component surface to the lower external surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized in a case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In the present invention, the alignment may direct to a fine positioning of the wireless power transfer system.

"Pairing": A process by which a vehicle is correlated with the unique dedicated primary device, at which it is located and from which the power will be transferred. The pairing may include the process by which a VA controller and GA controller of a charging spot are correlated. The correlation/association process may include the process of the establishment of a relationship between two peer communication entities.

"Command and control communication": A communication between the EV supply equipment and the EV exchanges information necessary to start, control and terminate the process of WPT.

"High level communication (HLC)": HLC is a special kind of digital communication. HLC is necessary for additional services which are not covered by command & control communication. The data link of the HLC may use a power line communication (PLC), but it is not limited.

"Low power excitation (LPE)": LPE means a technique of activating the primary device for the fine positioning ad pairing so that the EV can detect the primary device, and vice versa.

"Service set identifier (SSID)": SSID is a unique identifier including 32-characters attached to a header of a packet transmitted on a wireless LAN. The SSID identifies the basic service set (BSS) to which the wireless device attempts to connect. The SSID basically distinguishes multiple wireless LANs. Therefore, all access points (Aps) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is a name of the network to which you want to connect. It is similar to SSID but can be a more extended concept.

"Basic service set identifier (BSSID)": BSSID including 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller managing the at least one GA. The GA may comprise at least one wireless communication device. The charging station may mean a place having at least one GA, which is disposed in home, office, public place, road, parking area, etc.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus including the controller in conjunction with one or more other components, as would be appreciated by a person of ordinary skill in the art.

In an exemplary embodiment of the present invention, a "rapid charging" may refer to a method of directly converting AC power of a power system to DC power, and supplying the converted DC power to a battery mounted on an EV. Here, a voltage of the DC power may be DC 500 volts (V) or less.

In an exemplary embodiment of the present invention, a "slow charging" may refer to a method of charging a battery mounted on an EV using AC power supplied to a general home or workplace. An outlet in each home or workplace, or an outlet disposed in a charging stand may provide the AC power, and a voltage of the AC power may be AC 220V or less. Here, the EV may further include an on-board charger (OBC) which is a device configured for boosting the AC power for the slow charging, converting the AC power to DC power, and supplying the converted DC power to the battery.

Hereinafter, embodiments according to an exemplary embodiment of the present invention will be explained in detail by referring to accompanying figures.

FIG. 1 is a conceptual diagram illustrating a concept of a wireless power transfer (WPT) to which an exemplary embodiment of the present invention is applied.

Referring to FIG. 1, a wireless power transfer may be performed by at least one component of an electric vehicle (EV) 10 and a charging station 13, and may be used for wirelessly transferring power to the EV 10.

Here, the EV 10 may be usually defined as a vehicle supplying an electric power stored in a rechargeable energy storage including a battery 12 as an energy source of an electric motor which is a power train system of the EV 10.

However, the EV 10 according to an exemplary embodiment of the present invention may include a hybrid electric vehicle (HEV) having an electric motor and an internal combustion engine together, and may include not only an automobile but also a motorcycle, a cart, a scooter, and an electric bicycle.

Also, the EV 10 may include a power reception pad 11 including a reception coil for charging the battery 12 wirelessly and may include a plug connection for conductively charging the battery 12. Here, the EV 10 configured for conductively charging the battery may be referred to as a plug-in electric vehicle (PEV).

Here, the charging station 13 may be connected to a power grid 15 or a power backbone, and may provide an alternating current (AC) power or a direct current (DC) power to a power transmission pad 14 including a transmission coil through a power link.

Also, the charging station 13 may communicate with an infrastructure management system or an infrastructure server that manages the power grid 15 or a power network through wired/wireless communications, and performs wireless communications with the EV 10.

Here, the wireless communications may be Bluetooth, Zigbee, cellular, wireless local area network (WLAN), or the like.

Also, for example, the charging station 13 may be located at various places including a parking area attached to the owner's house of the EV 10, a parking area for charging an EV at a gas station, a parking area at a shopping center or a workplace.

A process of wirelessly charging the battery 12 of the EV 10 may begin with first placing the power reception pad 11 of the EV 10 in an energy field generated by the power transmission pad 14 of the charging station 13, and making the reception coil and the transmission coil be interacted or coupled with each other. An electromotive force may be induced in the power reception pad 11 as a result of the interaction or coupling, and the battery 12 may be charged by the induced electromotive force.

The charging station 13 and the transmission pad 14 may be referred to as a ground assembly (GA) in whole or in part, where the GA may refer to the previously defined meaning.

All or part of the internal components and the reception pad 11 of the EV 10 may be referred to as a vehicle assembly (VA), in which the VA may refer to the previously defined meaning.

Here, the power transmission pad 14 or the power reception pad 11 may be configured to be non-polarized or polarized.

In a case that a pad is non-polarized, there is one pole in a center of the pad and an opposite pole in an external periphery. Here, a flux may be formed to exit from the center of the pad and return at all to external boundaries of the pad.

In a case that a pad is polarized, it may have a respective pole at either end portion of the pad. Here, a magnetic flux may be formed based on an orientation of the pad.

Figure 2:
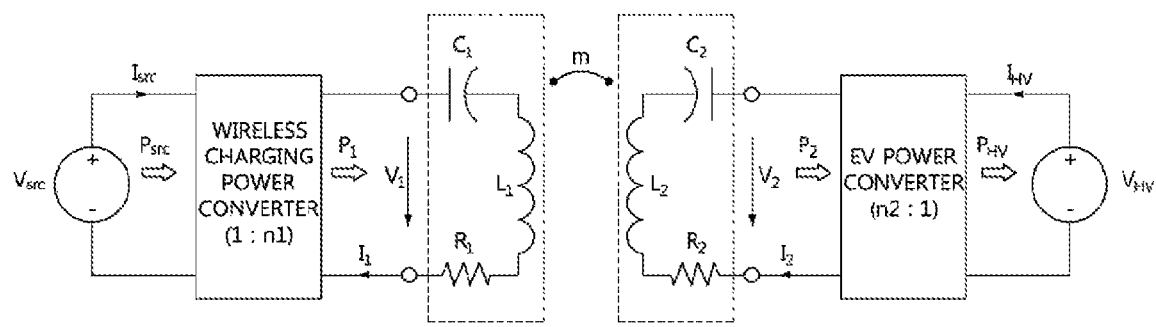
FIG. 2 is a conceptual diagram illustrating a wireless power transfer circuit according to an exemplary embodiment of the present invention.

FIG. 2 is a conceptual diagram illustrating a wireless power transfer circuit according to an exemplary embodiment of the present invention.

Referring to FIG. 2, a schematic configuration of a circuit in which a wireless power transfer is performed in an EV WPT system may be seen.

Here, the left side of FIG. 2 may be interpreted as expressing all or part of a power source $V_{src}$ supplied from the power network, the charging station 13, and the transmission pad 14 in FIG. 1, and the right side of FIG. 2 may be interpreted as expressing all or part of the EV including the reception pad and the battery.

First, the left side circuit of FIG. 2 may provide an output power $P_{src}$ corresponding to the power source $V_{src}$ supplied from the power network to a wireless charging power converter. The wireless charging power converter may supply an output power $P_1$ converted from the output power $P_{src}$ through frequency-converting and AC-to-DC converting to generate an electromagnetic field at a desired operating frequency in a transmission coil $L_1$.

Specifically, the wireless charging power converter may include an AC/DC converter for converting the power $P_{src}$ which is an AC power supplied from the power network into a DC power, and a low frequency (LF) converter for converting the DC power into a DC power having an operating frequency suitable for wireless charging. For example, the operating frequency for wireless charging may be determined to be within 80 to 90 kHz.

The power $P_1$ output from the wireless charging power converter may be supplied again to a circuit including the transmission coil $L_1$, a first capacitor $C_1$ and a first resistor $R_1$. Here, a capacitance of the first capacitor $C_1$ may be determined as a value to have an operating frequency suitable for charging together with the transmission coil $L_1$. Here, the first resistor $R_1$ may represent a power loss occurred by the transmission coil $L_1$ and the first capacitor $C_1$.

Further, the transmission coil $L_1$ may be made to have electromagnetic coupling, which is defined by a coupling coefficient m, with the reception coil $L_2$ so that a power $P_2$ is transmitted, or the power $P_2$ is induced in the reception coil $L_2$. Therefore, the meaning of power transfer in the present invention may be used together with the meaning of power induction.

Still further, the power $P_2$ induced in or transferred to the reception coil $L_2$ may be provided to an EV power converter. Here, a capacitance of a second capacitor $C_2$ may be determined as a value to have an operating frequency suitable for wireless charging together with the reception coil $L_2$, and a second resistor $R_2$ may represent a power loss occurred by the reception coil $L_2$ and the second capacitor $C_2$.

The EV power converter may include an LF/DC converter that converts the supplied power $P_2$ of a specific operating frequency to a DC power having a voltage level suitable for the battery $V_{HV}$ of the EV.

The electric power $P_{HV}$ converted from the power $P_2$ supplied to the EV power converter may be output, and the power $P_{HV}$ may be used for charging the battery $V_{HV}$ disposed in the EV.

Here, the right side circuit of FIG. 2 may further include a switch for selectively connecting or disconnecting the reception coil $L_2$ with the battery $V_{HV}$. Here, resonance frequencies of the transmission coil $L_1$ and the reception coil $L_2$ may be similar or identical to each other, and the reception coil $L_2$ may be positioned near the electromagnetic field generated by the transmission coil $L_1$.

Here, the circuit of FIG. 2 should be understood as an illustrative circuit for wireless power transfer in the EV WPT system used for embodiments of the present invention, and is not limited to the circuit illustrated in FIG. 2.

On the other hand, since the power loss may increase as the transmission coil $L_1$ and the reception coil $L_2$ are located at a long distance, it may be an important factor to properly set the relative positions of the transmission coil $L_1$ and the reception coil $L_2$.

Here, the transmission coil $L_1$ may be included in the transmission pad 14 in FIG. 1, and the reception coil $L_2$ may be included in the reception pad 11 in FIG. 1. Therefore, positioning between the transmission pad and the reception pad or positioning between the EV and the transmission pad will be described below with reference to the drawings.

Figure 3:
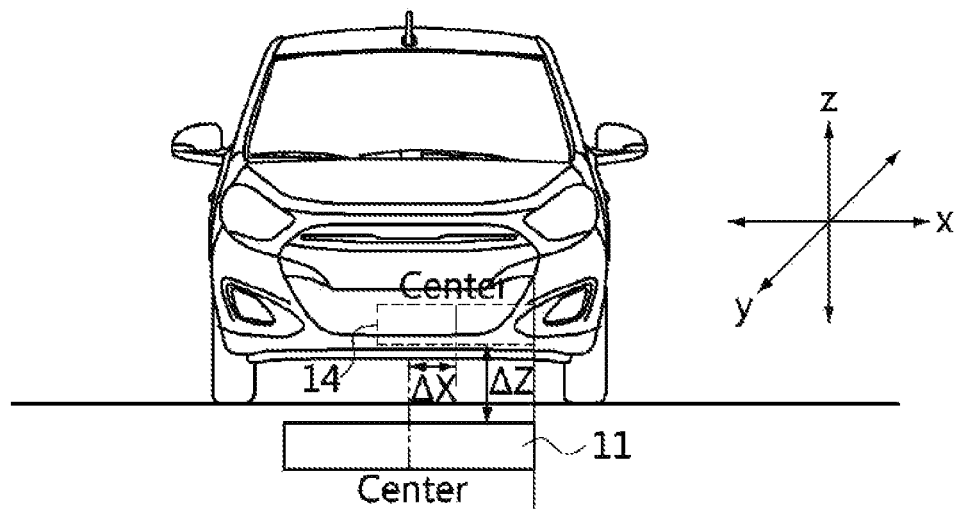
FIG. 3 is a conceptual diagram for explaining a concept of alignment in an EV wireless power transfer according to an exemplary embodiment of the present invention.

FIG. 3 is a conceptual diagram for explaining a concept of alignment in an EV wireless power transfer according to an exemplary embodiment of the present invention.

Referring to FIG. 3, a method of aligning the power transmission pad 14 and the power reception pad 11 in the EV in FIG. 1 will be described. Here, a positional alignment may correspond to the alignment, which is the above-mentioned term, and thus may be defined as a positional alignment between the GA and the VA, but is not limited to the alignment of the transmission pad and the reception pad.

Although the transmission pad 14 is illustrated as positioned below a ground surface as shown in FIG. 3, the transmission pad 14 may also be positioned on the ground surface, or positioned such that a top portion surface of the transmission pad 14 is exposed below the ground surface.

The reception pad 11 of the EV may be defined by different categories according to its heights (defined in the z direction) measured from the ground surface. For example, a class 1 for reception pads having a height of 100-150 millimeters (mm) from the ground surface, a class 2 for reception pads having a height of 140-210 mm, and a class 3 for reception pads having a height of 170-250 mm may be defined. Here, the reception pad may support a part of the above-described classes 1 to 3. For example, only the class 1 may be supported according to the type of the reception pad 11, or the class 1 and 2 may be supported according to the type of the reception pad 11.

Here, the height of the reception pad measured from the ground surface may correspond to the previously defined term 'vehicle magnetic ground clearance'.

Further, the position of the power transmission pad 14 in the height direction (i.e., defined in the z direction) may be determined to be located between the maximum class and the minimum class supported by the power reception pad 11. For example, when the reception pad supports only the class 1 and 2, the position of the power transmission pad 14 may be determined between 100 and 210 mm with respect to the power reception pad 11.

Still further, a gap between the center of the power transmission pad 14 and the center of the power reception pad 11 may be determined to be located within the limits of the horizontal and vertical directions (defined in the x and y directions). For example, it may be determined to be located within ±75 mm in the horizontal direction (defined in the x direction), and within ±100 mm in the vertical direction (defined in the y direction).

Here, the relative positions of the power transmission pad 14 and the power reception pad 11 may be varied in accordance with their experimental results, and the numerical values should be understood as exemplary.

Figure 4:
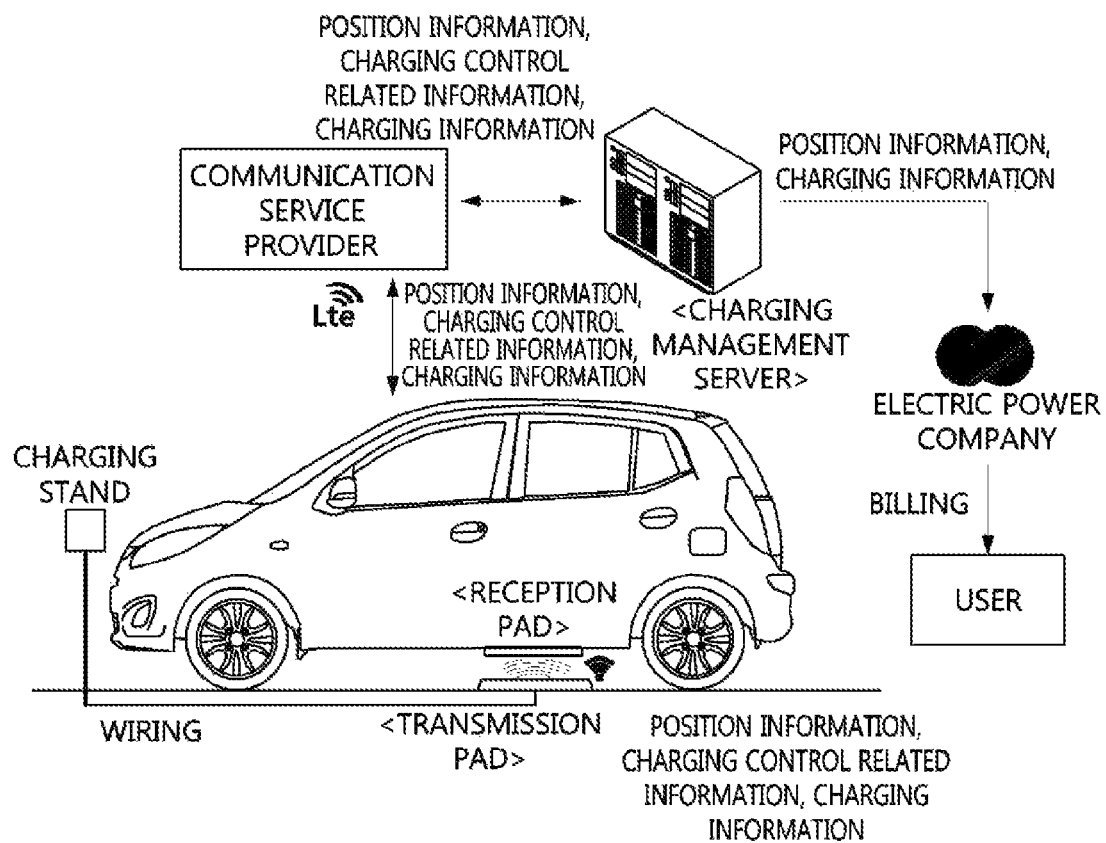
FIG. 4 is a conceptual diagram for explaining a procedure of charging and billing according to an exemplary embodiment of the present invention, which is applied to a wireless charging system.

FIG. 4 is a conceptual diagram for explaining a procedure of charging and billing according to an exemplary embodiment of the present invention, which is applied to a wireless charging system.

As explained referring to FIG. 1, FIG. 2, and FIG. 3, the reception pad 11 of the EV is positioned in the energy field of the transmission pad 14 so that the transmission coil of the pad 14 and the reception coil of the pad 11 are interacted and coupled, the electromotive force is induced in the reception pad 11 as a result of the interaction or coupling, and the battery of the EV is wirelessly charged by the induced electromotive force.

The user may perform charging control for starting or terminating the wireless charging through a control panel provided by a charging stand disposed in a charging station. The charging stand may be connected to the transmission pad via a wire.

The transmission pad according to an exemplary embodiment of the present invention may include a short-range wireless communication module. The short-range wireless communication module of the transmission pad may communicate with a short-distance wireless communication module in the EV to perform charging control, and transmit charging information related to the charging station to the EV. Meanwhile, the short-range wireless communication module may be located not only in the transmission pad but also in the charging stand connected to the transmission pad or elsewhere in the charging station.

Here, the charging information may include information including identification information related to the EV to be charged (e.g., electric vehicle identifier (EV ID)), a charging start time, a charging end time, the amount of charged energy, and the like.

Here, the short-range wireless communication module may be understood as including various communication modules configured for short-range wireless communication including a wireless local area network (WLAN) which is referred to as Wi-Fi, Bluetooth, Near-Field Communication (NFC), etc.

The short-range wireless communication module of the EV may be included in a telematics system (TMS) mounted on the EV. The TMS is a compound word of 'telecommunication' and 'informatics'. The TMS may provide user-oriented services including telex, videotex and facsimile by transmitting and receiving information between inside and outside of the EV or between vehicles based on voice and data communication using radio and position information system using a satellite system (e.g., GPS).

The wireless communication network used for the TMS may include a 3G or 4G mobile communication technology called Long-Term Evolution (LTE), a dedicated short-range communication (DSRC) for transmitting 1 Mbps high-speed wireless packet data in 5.8 GHz band, a Bluetooth which is mainly used to remotely manipulate peripherals including vehicle audio and display, or the like.

The TMS of the EV according to an exemplary embodiment of the present invention may also comprise a 3G or 4G communication module and may be connected to a server of a communication service provider and further to a charging management server through a mobile communication network. The EV may transmit position information related to the charging station, charging control related information, and charging information related to the EV, which are received from the transmission pad (or, GA) of the charging station, to the mobile communication network through the TMS. The communication service provider receiving the position information, the charging control related information, and the charging information may transfer the corresponding information to a charging management server. The charging management server may transfer the position information related to the charging station and the charging information related to the corresponding EV to an electric power company, and the electric power company may perform billing for the charging to the related user using the transferred information.

Figure 5:
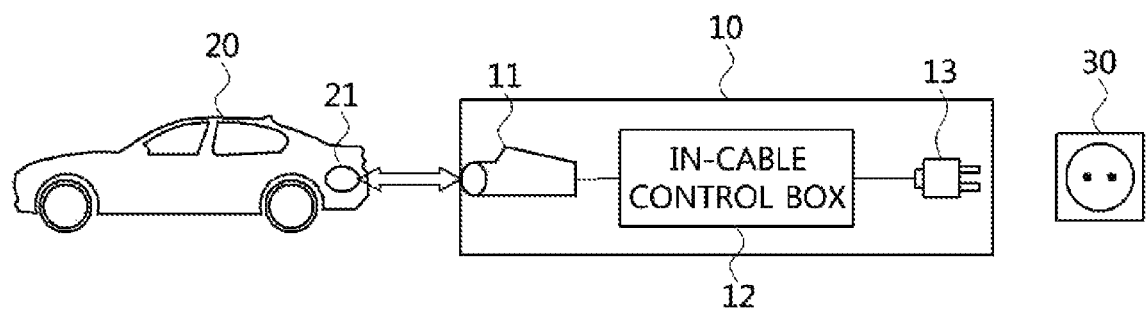
FIG. 5 is a conceptual diagram for explaining an EV conductive charging method according to an exemplary embodiment of the present invention.

FIG. 5 is a conceptual diagram for explaining an EV conductive charging method according to an exemplary embodiment of the present invention.

Referring to FIG. 5, an EV conductive charging method may be performed based on interoperations among an EV charging cable 30, an EV 20, and a power outlet 40 disposed in a conventional building or charging stand.

Here, the EV 20 may be generally defined as an automobile that supplies an electric power from a rechargeable energy storage device including a battery mounted on the EV 20 as an energy source of an electric motor.

Also, the EV 20 according to an exemplary embodiment of the present invention may include a hybrid electric vehicle (HEV) having an electric motor and an internal combustion engine together, and may include not only an automobile but also a motorcycle, a cart, a scooter, and an electric bicycle.

Also, the EV 20 according to an exemplary embodiment of the present invention may include an inlet 21 for conductively charging the battery. Here, the EV 20 configured for conductively charging the battery may be referred to as a plug-in electric vehicle (PEV) defined above.

Also, the inlet 21 provided in the EV 20 according to an exemplary embodiment of the present invention may support the slow charging (also referred to as an 'on-board charging') or the rapid charging. Here, the EV 20 may include either a single inlet that supports both of the slow charging and the rapid charging through a plug connection, or inlets that respectively support the slow charging and the rapid charging.

Also, the EV 20 according to an exemplary embodiment of the present invention may include an EVCC for communicating with other external devices inside or outside, and use the EVCC to control the conductive charging by communicating with an external charging stand or the EV charging cable 30 (i.e., an in-cable control box (ICCB) mounted on the EV charging cable 30).

In addition, the EV 20 according to an exemplary embodiment of the present invention may include an on-board charger (OBC) to support the slow charging through alternating current (AC) power supplied from a general power system. The OBC may boost the AC power supplied from the general power system to be supplied to the battery in the EV 20 at the time of the slow charging. Accordingly, when the AC power for the slow charging is supplied to the inlet of the EV 20, the slow charging may be performed through the OBC. Further, when a direct current (DC) power for the rapid charging is supplied to the corresponding inlet, the rapid charging may be performed without the OBC.

Here, the EV charging cable 30 may comprise at least one of a charging plug 31 which is connected to the inlet 21 of the EV, an outlet plug 33 which is connected to the power outlet 40, and the in-cable control box (ICCB) 32. Here, the charging plug 31 may be a connection part that can be electrically connected to the inlet 21 of the EV 20. Here, the ICCB 32 may communicate with the EVCC of the EV 20 to receive status information related to the EV or to control the electric power charging to the EV 20.

Herein, although the ICCB 32 is illustrated as being included in the EV charging cable 30, it may be mounted in a place other than the EV charging cable 30, or may be combined with a SECC described below or replaced with the SECC. Here, the outlet plug 33, as an electrical connection mechanism including a general plug or a cord set, may be connected to the outlet 40 to which power is supplied. For example, the electric power outlet 40 may refer to an outlet disposed at various places including a parking lot attached to a house of an owner of the EV 20, a parking area for charging an EV at a gas station, or a parking area at a shopping center or an office building.

In addition, a device for controlling a charging procedure by communicating with a of the components of the ICCB 32 or the EV 20 (e.g., EVCC) may be disposed in a building or place (e.g., a charging stand) where the outlet 40 is disposed. Such the device may be referred to as the SECC. Here, the SECC may communicate with an infrastructure management system for managing a power grid, a management server (referred to as a 'community server') of an apartment house in which the outlet 40 is disposed, or an infrastructure server through wired or wireless communications.

Here, the outlet 40 may supply AC power of the power system as it is. For example, AC power corresponding to at least one of single-phase two-wire (1P2W) type and three-phase four-wire (3P4W) type may be supplied.

Also, the EV charging cable 30 may support the slow charging, and supply electric power for the slow charging to the EV 20. Here, electric power of 3.3 to 7.7 kWh may be supplied to the EV 20 for the slow charging.

Also, the EV charging cable 30 may support the rapid charging, and supply electric power for the rapid charging to the EV 20. Here, electric power of 50 to 100 kWh may be supplied to the EV 20 for the rapid charging.

Meanwhile, as a billing manner used in the conventional EV charging system using the conductive charging illustrated in FIG. 5, a method in which an RFID tag having position information is attached to a power outlet for the EV, the ICCB recognizes the RFID tag, the ICCB transmits the position information and the amount of energy charged to the EV to a server through a 3G communication module existing in the ICCB, and the server performs billing for the charging using the information, a method in which an ICCB having a capability of communicating with a power outlet which has its position information and is dedicated only for EV charging is used to transmit the position information related to the power outlet and the amount of charged energy to a server, a method in which a GPS function of a user terminal (e.g., a smart phone) is used to identify a position of the charging station, the user terminal communicates with the ICCB, and information on the position of the charging station and the amount of the charged energy to a server, or the like may be used.

However, in these cases, there are problems including the increase in hardware cost and monthly communication fee due to addition of the 3G communication module in the ICCB, an additional mobile communication fee for the billing, the additional cost for outlet with position information (e.g., cost of the RFID tag), and degradation of positioning accuracy when using a GPS.

Figure 6:
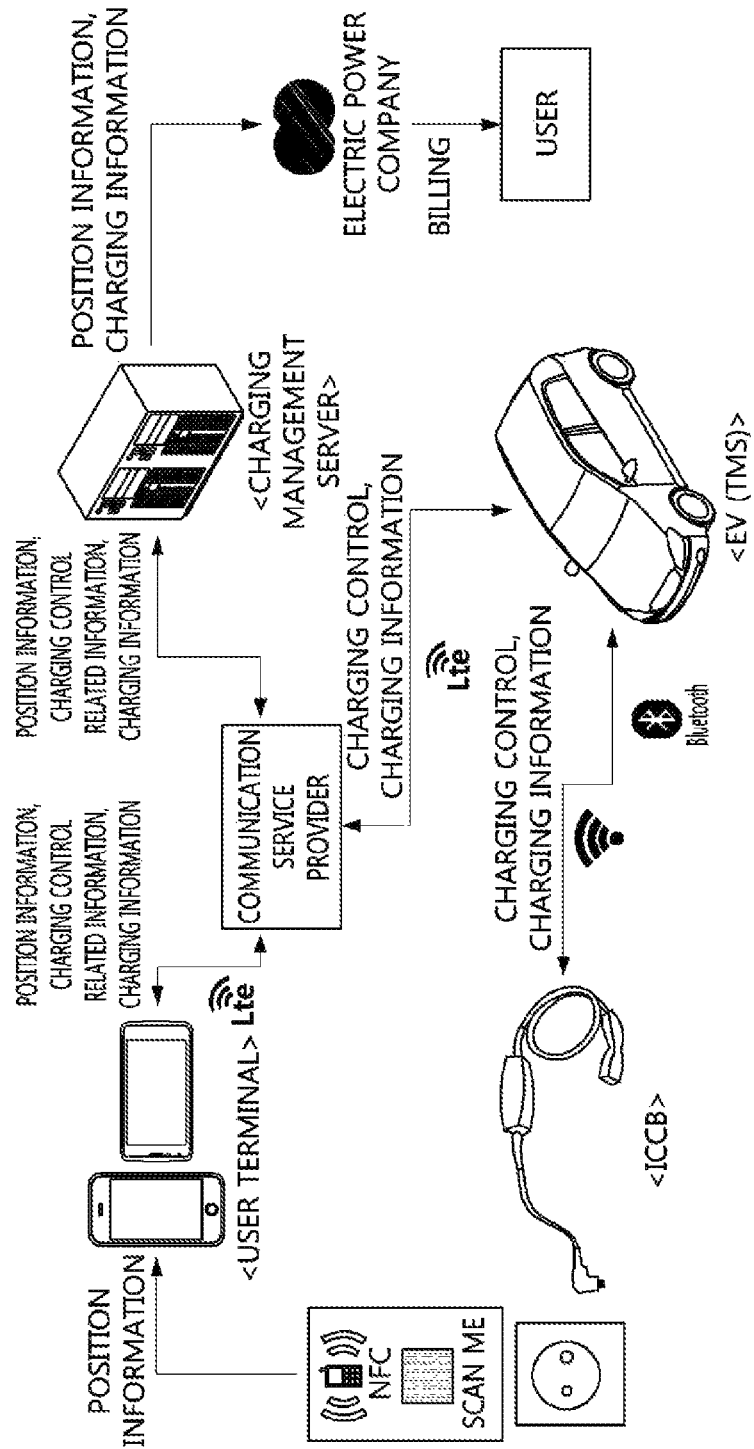
FIG. 6 is a conceptual diagram for explaining a procedure of charging and billing according to an exemplary embodiment of the present invention, which is applied to a conductive charging system.

FIG. 6 is a conceptual diagram for explaining a procedure of charging and billing according to an exemplary embodiment of the present invention, which is applied to a conductive charging system.

As described by referring to FIG. 5, the conductive charging may be started by connecting the charging plug 31 of the charging cable 30 to the inlet 21 of the EV 20 with the outlet plug 33 of the charging cable connected to the electric power outlet 40.

The ICCB may communicate with the EV 20 and control charging to the EV 20. Here, the ICCB may include a short-range wireless communication module. The short-range wireless communication module may communicate with the short-distance wireless communication module in the EV, and may be used to transmit the position information related to the charging station and charging information to the EV. Meanwhile, the short-range wireless communication module may be located not only in the ICCB but also in the charging stand connected to the transmission pad or elsewhere in the charging station.

Here, the short-range wireless communication module may be understood as including various communication devices configured for short-range wireless communications including Wi-Fi, Bluetooth, NFC, etc.

The short-range wireless communication module of the EV may be included in a telematics system (TMS) mounted on the EV.

The TMS of the EV according to an exemplary embodiment of the present invention may also comprise a 3G or 4G communication module (i.e., a communication module supporting a cellular network communication) and may be connected to a server or a communication service provider and further to a charging management server through a mobile communication network. The EV may transmit position information related to the charging station, charging control related information, and charging information related to the EV, which are received from the transmission pad of the charging station, to the mobile communication network through the TMS.

Meanwhile, a billing system for EV charging according to an exemplary embodiment of the present invention may include a user terminal. The user terminal may communicate with an intelligent outlet through NFC, Wi-Fi, Bluetooth, etc. The intelligent outlet may be electrically coupled to the ICCB. Also, the user terminal may be connected to the communication service provider through a mobile communication network including 3G, LTE, and LTE-Advanced (LTE-A). The communication service provider may be connected to the charging management server, the charging management server may transmit the position information and charging information to the user who possess or carry the user terminal.

Here, the user terminal may be a of various devices which can exchange data or information with the charging management server according to an exemplary embodiment of the present invention by communicating with a mobile communication network including a desktop computer, a laptop computer, a smart phone, a tablet PC, a mobile phone, a smart watch, a smart glass, an e-book reader, a portable multimedia player (PMP), a portable game player, a navigation device, a digital camera, a digital multimedia broadcasting (DMB) player, a digital audio recorder, a digital audio player, a digital video recorder, a digital video player, a Personal Digital Assistant (PDA), and the like.

The communication service provider receiving the position information related to the charging station, the charging control related information, and the charging information related to the EV may transfer the received information to the charging management server. The charging management server may transmit the position information related to the charging station and the charging information related to the corresponding EV to the electric power company, and the electric power company may perform billing for the charging to the relevant user using the information.

According to the embodiment illustrated in FIG. 6, instead of a 3G or 4G communication module, a short-range wireless communication module may be added in the ICCB to establish a short-range wireless communication connection between the ICCB and the EV, and the charging information may be transmitted to the charging management server by use of the in-vehicle TMS. According to such exemplary embodiment of the present invention, a more economical and convenient billing system for EV charging may be provided by connecting the in-vehicle TMS and the ICCB as compared to the conventional method.

Figure 7:
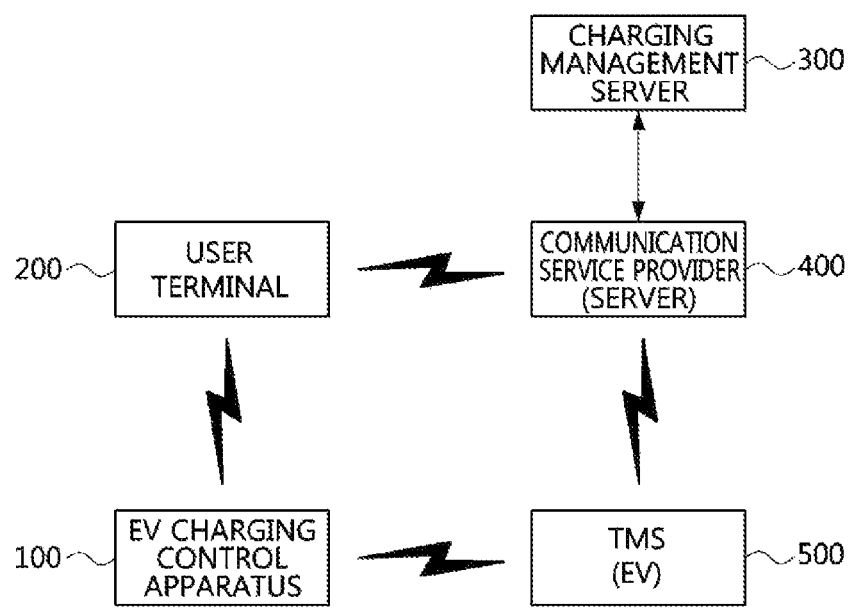
FIG. 7 is a block diagram illustrating a billing system for EV charging according to an exemplary embodiment of the present invention.

FIG. 7 is a block diagram illustrating a billing system for EV charging according to an exemplary embodiment of the present invention.

Referring to FIG. 7, a billing system for EV charging may be configured to comprise an EV charging control apparatus 100, a user terminal 200 that a user has or carries, a charging management server 300, a communication service provider 400 (i.e., a server of the communication service provider), and an EV 500 (i.e., a TMS mounted on the EV).

The EV charging control apparatus 100 according to an exemplary embodiment of the present invention may be connected to a power grid, communicate with the EV 500, and control charging to the EV 500. The EV charging control apparatus 100 may be at least one of an ICCB and a control stand in a charging station when using the conductive charging method, or at least one of a transmission pad, a GA, a SECC, and a control stand in a charging station when using the inductive charging method.

The user terminal 200 may communicate with the EV charging control apparatus 100 through NFC, Wi-Fi, Bluetooth, etc., and acquire the position information related to the charging station where the EV charging control apparatus 100 is located. The user terminal 200 may be connected to the communication service provider 400 through a mobile communication network.

On the other hand, the EV charging control apparatus 100 may be provided with a short-range wireless communication module, communicate with a short-range wireless communication module of the EV 500, and transmit the position information related to the charging station and the charging information to the EV 500. The short-range wireless communication module of the EV 500 may be included in the TMS of the EV 500. The EV 500 may communicate with the communication service provider 400 via the TMS, and transmit the position information related to the charging station and the charging information to the communication service provider 400.

The communication service provider 400 may interoperate with the charging management server 300 which is a host server. The communication service provider 400 may provide the charging management server 300 with charging control related data or messages, the charging information, and the position information which are received from the user terminal 200 and the EV 500. The charging management server 300 may collect and manage EV charging related information from various regions and various vehicles, and may provide necessary information to the user. The charging management server 300 may provide position information and charging information related to the EV to the user terminal 200. The user terminal 200 may identify the information provided by the charging management server 300, and transmit charging control data or messages to the charging management server 300 through the mobile communication network to perform charging control on the EV through the charging management server 300.

The EV charging related information collected and managed by the charging management server 300 may be finally transferred to the electric power company so that the electric power company performs billing for the EV charging.

Figure 8:
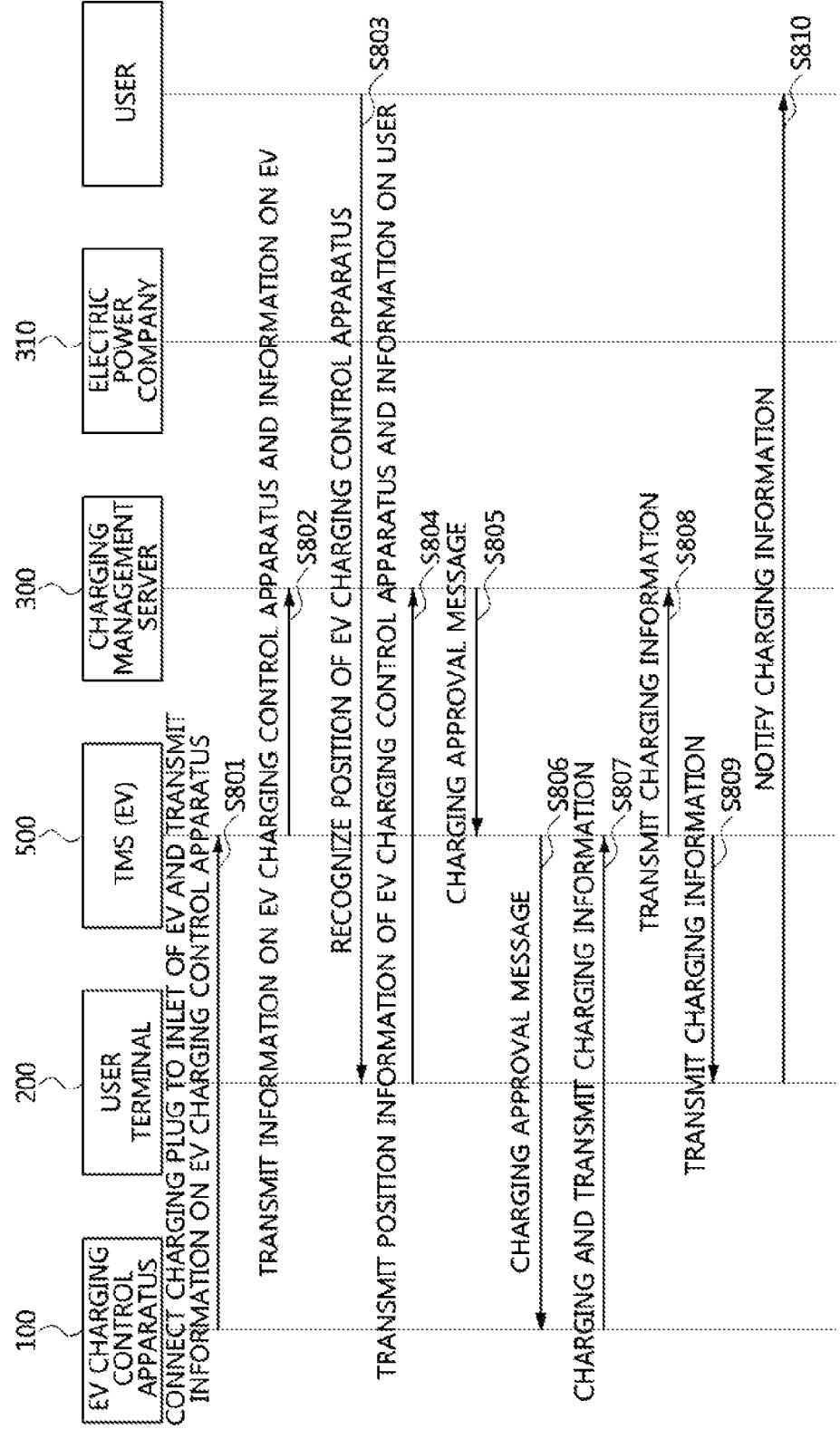
FIG. 8 is a sequence chart for explaining a billing method for EV charging according to an exemplary embodiment of the present invention.

FIG. 8 is a sequence chart for explaining a billing method for EV charging according to an exemplary embodiment of the present invention.

Referring to FIG. 8, an operation flow will be described by focusing on the EV charging control apparatus 100, the user terminal 200, the charging management server 300, and the EV 500 having a TMS which were described with reference to FIG. 7. A billing method for EV charging will be described by focusing on an operation of terminating the EV charging.

As described above, the EV charging control apparatus 100 may be an ICCB in a case of conductive charging, or may be a transmission pad, a GA, a SECC, or a charging stand in a case of inductive charging.

Referring to FIG. 8, when a user who wishes to charge the EV 500 connects the charging plug of the EV charging control apparatus 100 to the EV 500 (i.e., the inlet of the EV 500), the EV 500 may attempt pairing with the EV charging control apparatus 100 through short-range wireless communication. When the pairing is completed, the EV 500 may acquire information on the EV charging control apparatus 100 (S801), and transmit the information on the EV charging control apparatus 100 and information on the EV 500 to the charging management server 300 (S802).

Here, the operation of connecting the charging plug to the inlet may correspond to the case of conductive charging. However, in the case of inductive charging, the operation may be substituted with an operation that the transmission pad of the GA is disposed at a certain distance from the reception pad of the VA in the EV 500 and a charging start button is pressed by the user through a control panel or the like provided on the charging stand.

Meanwhile, the user may recognize a tag (e.g., NFC, Quick Response (QR) code, etc.) containing position information related to the EV charging control apparatus 100 by use of the user terminal 200 (S803), and transmit the position information and information on the user to the charging management server 300 by use of the user terminal 200 (S804). Here, in the case of conductive charging, the position information related to the EV charging control apparatus 100 may be substituted with position information related to the power outlet.

Meanwhile, the position information related to the EV charging control apparatus 100 or the charging station may be obtained instead of the user terminal 200 through short-range wireless communication between the transmission pad and the EV 500 as described with reference to FIG. 4.

The charging management server 300 may receive the position information related to the EV charging control apparatus 100 and the information on the user from the user terminal 200, determine whether a charging to the EV 500 is allowed through the corresponding EV charging control apparatus 100 and the charging station by analyzing the information on the EV charging control apparatus 100 and the information on the EV 500, and approve the charging to the EV 500 by transmitting a charging approval message to the EV 500 when the charging to the EV 500 is determined to be allowed (S805).

Here, the information on the EV 500 may include at least one of identification information related to the EV 500, a charging method, a charging capacity, and the like. The information on the EV charging control apparatus may include at least one of identification information related to the EV charging control apparatus 100, information on the charging station where the EV charging control apparatus 100 is located, the position information related to the EV charging control apparatus 100 or the charging station, and information on a charging method provided by the EV charging control apparatus 100.

The EV 500 receiving the charging approval message may transfer the charging approval message to the EV charging control apparatus 100 (S806). The EV charging control apparatus 100 having received the charging approval message may start the charging to the EV 500 and may transmit charging information to the EV 500 in real time during the charging (S807). The charging information may be transferred to the charging management server 300 (S808).

Meanwhile, the EV 500 may transmit the charging information to the user terminal 200 during the charging (S809) so that the user can easily identify the charging information (S810). Accordingly, the user may remotely control the EV charging using the user terminal 200.

Figure 9:
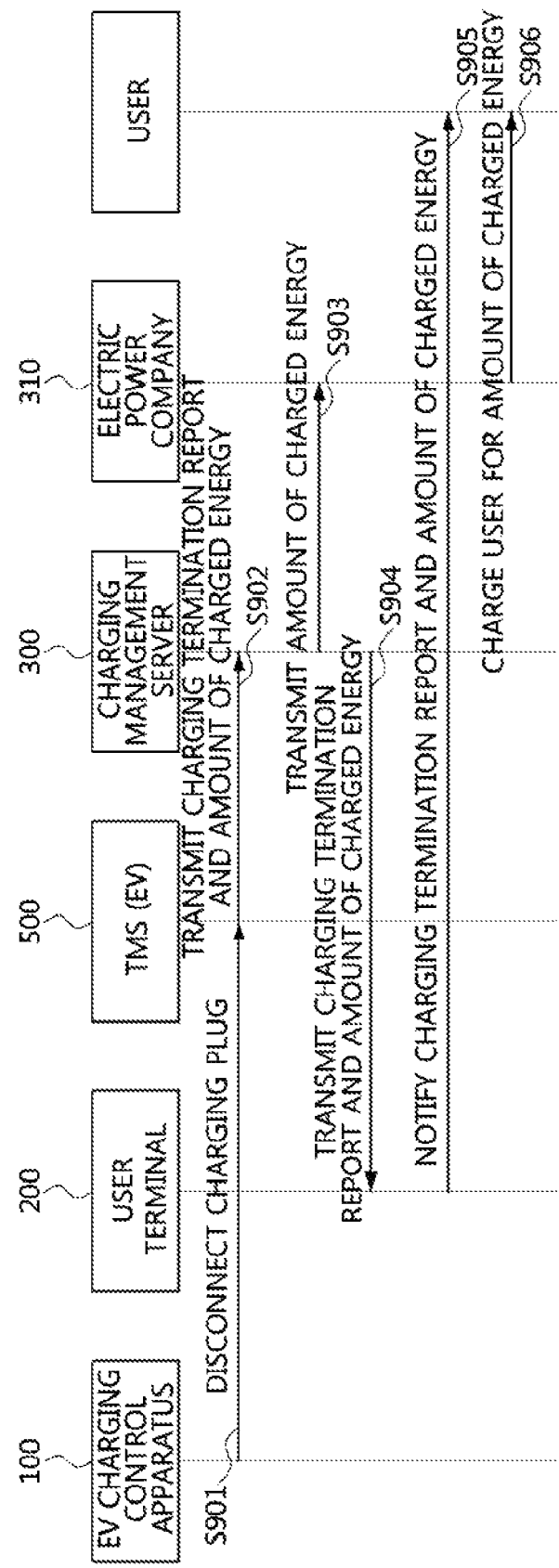
FIG. 9 is a sequence chart for explaining a billing method for EV charging according to another exemplary embodiment of the present invention.

FIG. 9 is a sequence chart for explaining a billing method for EV charging according to another exemplary embodiment of the present invention.

Referring to FIG. 9, an operation flow will be described by focusing on the EV charging control apparatus 100, the user terminal 200, the charging management server 300, and the EV 500 having a TMS which were described with reference to FIG. 7. A billing method for EV charging will be described by focusing on an operation of terminating the EV charging.

As described above, the EV charging control apparatus 100 may be an ICCB in a case of conductive charging, or may be a transmission pad, a GA, a SECC, or a charging stand in a case of inductive charging.

A situation in which the EV charging is terminated may be classified into a case where the battery of the EV is fully charged and thus the EV charging is terminated, and a case where the EV charging is terminated by an external event.

In the former case, when the EV charging is completed, a charging termination report and information on the amount of charged energy may be transmitted to the charging management server through the in-vehicle TMS (S902), and the EV charging control apparatus 100 connected to the EV 500 may also receive the charging termination report. The user who has identified the termination of EV charging through the EV charging control apparatus 100 may disconnect the charging plug from the EV 500 (S901) (in the case of conductive charging). Alternatively, the user may identify the termination of EV charging through a control panel of the EV charging control apparatus 100 and confirm the termination of EV charging (in the case of inductive charging).

In the latter case, that is, when the EV charging is interrupted remotely via the user terminal 200 or an in-vehicle interface, the EV 500 may recognize that the charging plug is disconnected (901), and transmit the charging termination report and information on the amount of charged energy to the charging management server 300 (S902). Here, the in-vehicle interface may include at least one of an audio video navigation (AVN) system and the TMS.

The charging management server 300 may transmit information on the amount of charged energy to the electric power company 310, and the electric power company 310 may determine a fee for the EV charging based on the information on the amount of charged energy, and charge the user for the fee (S906).

The charging management server 300 may provide a signal, data, or message for the charging termination report and the information on the amount of charged energy to the user terminal 200 (S904). The user terminal 200 may inform the charging termination report and the information on the amount of charged energy to the user in various forms (S905).

In the exemplary embodiments described above, a receiving side receiving a signal, data, or message may return an OK response to a transmitting side transmitting the signal, data, or message. In a case that the transmitting side does not receive an OK response from the receiving side, the transmitting side may retransmit the signal, data, or message a predetermined number of times to the receiving side. Further, when a failure response other than the OK response is received from the receiving side, the transmitting side may resume the EV charging from the beginning, from a recorded specific time point in the EV charging process until which the EV charging was normally performed, or from the charged amount corresponding to the specific time point.

Figure 10:
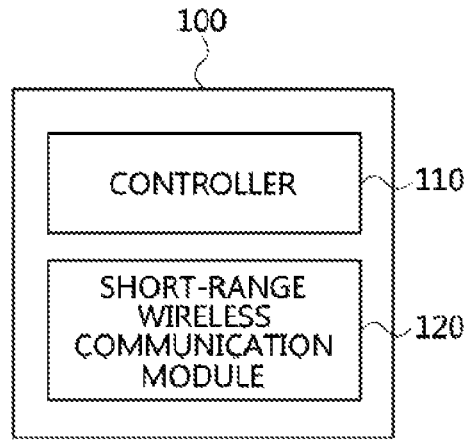
FIG. 10 is a block diagram illustrating an EV charging control apparatus according to an exemplary embodiment of the present invention.

FIG. 10 is a block diagram illustrating an EV charging control apparatus according to an exemplary embodiment of the present invention.

Referring to FIG. 10, an EV charging control apparatus according to an exemplary embodiment may comprise a controller 110 and a short-range wireless communication module 120.

The controller 110 may be configured to receive a charging approval message for an EV to which the EV charging control apparatus 100 is connected from a charging management server, start a charging to the EV in response to the charging approval message, measure and accumulate the amount of energy being charged to the EV, recognize a charging termination operation from a user of the EV or the EV, and derive charging information based on the amount of charged energy in response to the charging termination operation. Also, the controller 110 may identify a position of the EV charging control apparatus or a charging station where the EV charging control apparatus is located, and transmit information on the position to the EV through the short-range wireless communication module 120. The controller 110 may comprise a processor and a storage device including a memory storing instructions executed by the processor, and the instructions may be configured to perform the above-described operations of the controller 110.

The short-range wireless communication module 120 may establish a connection with a short-range wireless communication module mounted on the EV, and transmit the charging information to the EV. The short-range wireless communication module 120 may support WLAN or Bluetooth communication.

Here, the EV charging control apparatus 100 may be an ICCB in a case of conductive charging, or may be a transmission pad, a GA, a SECC, or a charging stand in a case of inductive charging.

Meanwhile, in a case that the EV charging control apparatus 100 is an ICCB, the ICCB may determine whether a charging plug of the ICCB is connected to the inlet of the EV or not, and transmit information on the ICCB to the EV when the charging plug of the ICCB is determined to be connected to the EV.

Also, the charging information may include at least one of identification information (e.g., identifier) of the EV, a charging start time, a charging end time, and the amount of charged energy.

Figure 11:
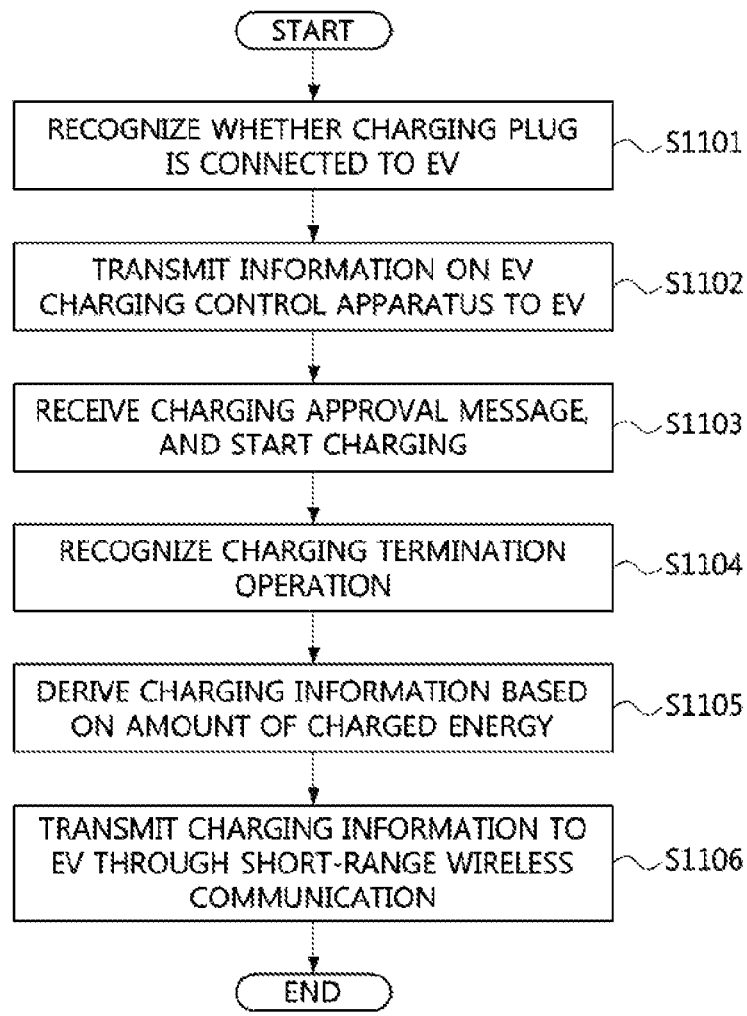
FIG. 11 is a flow chart for explaining an EV charging control method according to an exemplary embodiment of the present invention.

FIG. 11 is a flow chart for explaining an EV charging control method according to an exemplary embodiment of the present invention.

An EV charging control method according to an exemplary embodiment may be performed by an EV charging control apparatus, in particular, an ICCB, but is not limited thereto.

In the EV charging control method, the EV charging control apparatus may recognize whether a charging plug is connected to an EV when the EV charging control apparatus provides a conductive charging service to the EV (S1101), and transmit information on the EV charging control apparatus to the EV when the charging plug is connected to the EV (S1102). As such, the EV charging control apparatus may receive a charging approval message from the charging management server, and start the charging to the EV (S1103). After the start of the charging, the charging control apparatus may measure and accumulate the amount of energy being charged to the EV. As such, when a charging termination operation is recognized from a user of the EV or the EV (S1104), the EV charging control apparatus may derive charging information based on the amount of charged energy (S1105).

The derived charging information may be transmitted to the EV using a short-range wireless communication (S1106).

Figure 12:
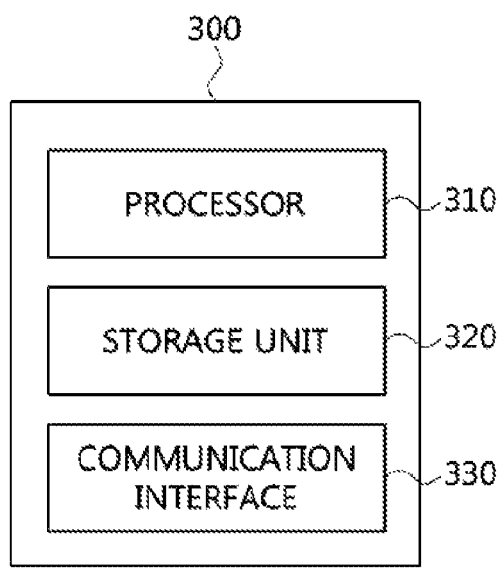
FIG. 12 is a block diagram illustrating a charging management server according to an exemplary embodiment of the present invention.

FIG. 12 is a block diagram illustrating a charging management server according to an exemplary embodiment of the present invention.

As shown in FIG. 12, a charging management server according to an exemplary embodiment may comprise a processor 310, a storage device 320 storing instructions executed by the processor 310, and a communication interface 330.

The instructions executed by the processor may be configured to receive information on an EV, an EV charging control apparatus controlling charging to the EV, and a user of the EV, determine whether to approve the charging to the EV based on the received information, transmit a charging approval message to the EV when the charging to the EV is approved, receive charging information from the EV charging control apparatus when the charging to the EV is terminated, and transmit the charging information as billing information for the EV charging to a server of an electric power company. Here, the receiving and transmitting operations may be performed through the communication interface 330 under control of the processor 310 executing the instructions.

Also, the storage device 320 may further store information on at least one charging station, at least one EV charging control apparatus, at least one EV, and at least one user of the at least one EV, and may provide the processor 310 with data required for approval of the charging to the EV and derivation of the charging information for the charging to the EV.

The communication interface 330 may provide a communication/network interface for communicating with a server of a communication service provider providing a communication service to a user of an EV and the server of the electric power company, and may receive information on a position of the charging control apparatus or a charging station where the charging control apparatus is located from the EV or a terminal of the user.

Figure 13:
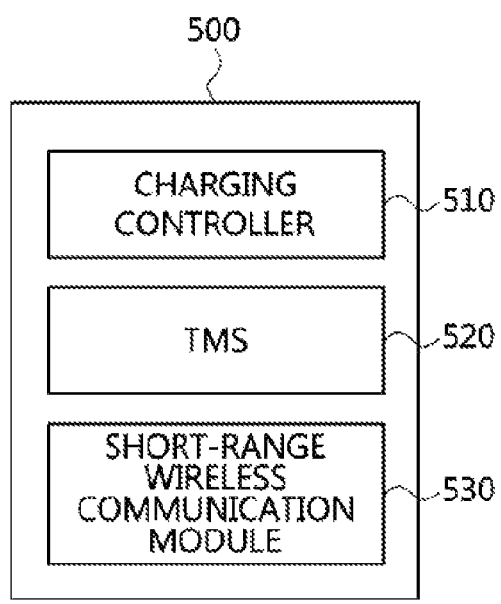
FIG. 13 is a block diagram illustrating an electric vehicle according to an exemplary embodiment of the present invention.

FIG. 13 is a block diagram illustrating an electric vehicle according to an exemplary embodiment of the present invention.

As shown in FIG. 13, an EV according to an exemplary embodiment may comprise a charging controller 510, a TMS 520, and a short-range wireless communication module 530.

The charging controller 510 may receive a charging approval message from a charging management server, transfer the charging approval message to an EV charging control apparatus, charge a battery with electric power provided through the EV charging control apparatus, and transmit charging information received from the EV charging control apparatus according to a charging termination operation to the charging management server.

The short-range wireless communication module 530 may receive the charging information from the EV charging control apparatus using WLAN or Bluetooth, and the TMS 520 may transfer the charging information to the charging management server through a mobile communication network to which the TMS 520 and the charging management server are connected.

Here, the TMS 520 and the short-range wireless communication module 530 may be implemented as a single communication module by integrating functions of the both entities. In the instant case, the communication module may receive the charging information from the EV charging control apparatus using the short-range wireless communication, and perform data transmission and reception with the mobile communication network to which the TMS 520 and the charging management server are connected.

The methods according to embodiments of the present invention may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for an exemplary embodiment of the present invention or can be publicly known and available to those who are skilled in the field of computer software.

Examples of the computer readable medium may include a hardware device including ROM, RAM, and flash memory, which are configured to store and execute the program instructions. Examples of the program instructions include machine codes made by, for example, a compiler, as well as high-level language codes executable by a computer, using an interpreter. The above exemplary hardware device can be configured to operate as at least one software module to perform the operation of the present invention, and vice versa.

While some aspects of the present invention have been described in the context of an apparatus, it may also represent a description according to a corresponding method, wherein the block or apparatus corresponds to a method step or a feature of the method step. Similarly, aspects described in the context of a method may also be represented by features of the corresponding block or item or corresponding device. Some or all of the method steps may be performed by (or using) a hardware device such as, for example, a microprocessor, a programmable computer, or an electronic circuit. In various exemplary embodiments, one or more of the most important method steps may be performed by such an apparatus.

In embodiments, a programmable logic device (e.g., a field programmable gate array (FPGA)) may be used to perform some or all of the functions of the methods described herein. In embodiments, the FPGA may operate in conjunction with a microprocessor to perform one of the methods described herein. Generally, the methods are preferably performed by some hardware device.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electric vehicle (EV) charging control apparatus comprising:
   a controller receiving a charging approval message for an EV from a charging management server, starting a charging to the EV in response to the charging approval message, measuring and accumulating an amount of energy charged to the EV, recognizing a charging termination operation from a user of the EV or the EV, and deriving charging information based on the amount of energy charged in response to the charging termination operation; and
   a short-range wireless communication module establishing a connection with a short-range wireless communication module mounted on the EV, and transmitting the charging information to the EV, wherein the charging information includes billing information for an EV charging and the billing information is transferred by an in-vehicle telematics system (TMS) through a cellular network communication to the charging management server or an electric power company that determines a fee for the EV charging based on the amount of energy charged, and wherein the charging information includes identification information related to the EV, a charging start time, a charging end time, and the amount of energy charged.

2. The EV charging control apparatus according to claim 1, wherein the EV charging control apparatus is an in-cable control box (ICCB).

3. The EV charging control apparatus according to claim 1, wherein the EV charging control apparatus is a transmission pad, a ground assembly (GA), or a supply equipment communication controller (SECC).

4. The EV charging control apparatus according to claim 1, wherein the short-range wireless communication module communicates with the short-range wireless communication module mounted on the EV using a wireless Local Area Network (WLAN) or a Bluetooth.

5. The EV charging control apparatus according to claim 1, wherein the controller identifies a position of the EV charging control apparatus or a charging station where the EV charging control apparatus is located, and transmits information on the position to the EV through the short-range wireless communication module.

6. The EV charging control apparatus according to claim 2, wherein the ICCB is configured to determine whether a charging plug of the ICCB is connected to the EV or not, and transmits information on the ICCB to the EV when the charging plug of the ICCB is determined to be connected to the EV.

7. An electric vehicle (EV) charging control method performed in an EV charging control apparatus, comprising:
receiving a charging approval message for an EV from a charging management server;
starting a charging for the EV in response to the charging approval message, and accumulating and measuring an amount of energy charged to the EV;
recognizing a charging termination operation from a user or the EV, and deriving charging information based on the amount of energy charged in response to the charging termination operation; and
transmitting the charging information to the EV using a short-range wireless communication,
wherein the charging information includes billing information for an EV charging and the billing information is transferred by an in-vehicle telematics system (TMS) through a cellular network communication to the charging management server or an electric power company that determines a fee for the EV charging based on the amount of energy charged, and
wherein the charging information includes identification information related to the EV, a charging start time, a charging end time, and the amount of energy charged.

8. The EV charging control method according to claim 7, wherein the EV charging control apparatus is an in-cable control box (ICCB).

9. The EV charging control method according to claim 7, wherein the short-range wireless communication includes a wireless Local Area Network (WLAN) or a Bluetooth.

10. A charging management server comprising:
a processor;
a storage device storing instructions executed by the processor and information on at least one charging station, at least one charging control apparatus, at least one electric vehicle (EV), and at least one user of the at least one EV; and
a communication interface for communicating with a server of a communication service provider providing a communication service to a user of an EV and a server of an electric power company,
wherein the instructions are configured to:
receive, as connected to the EV, information on the EV, an EV charging control apparatus controlling charging to the EV, and the user of the EV through the communication interface;
determine whether to approve the charging to the EV based on the received information;
transmit a charging approval message to the EV when the charging to the EV is determined to be approved through the communication interface;
receive charging information from the EV charging control apparatus according to a termination of the charging to the EV through the communication interface; and
transmit the charging information as billing information for the charging to the EV to the server of the electric power company through the communication interface,
wherein the charging information includes the billing information for an EV charging and the billing information is transferred by an in-vehicle telematics system (TMS) through a cellular network communication to the charging management server or the electric power company that determines a fee for the EV charging based on the amount of energy charged, and
wherein the charging information includes identification information related to the EV, a charging start time, a charging end time, and the amount of energy charged.

11. The charging management server according to claim 10, wherein the communication interface receives, from the EV or a terminal of the user of the EV, information on a position of the EV charging control apparatus or a charging station where the EV charging control apparatus is located.

12. The charging management server according to claim 10, wherein the EV charging control apparatus is an in-cable control box (ICCB), a transmission pad, a ground assembly (GA), or a supply equipment communication controller (SECC).

13. An electric vehicle (EV) comprising:
a charging controller receiving a charging approval message from a charging management server, transferring the charging approval message to an EV charging control apparatus, charging a battery with electric power provided through the EV charging control apparatus, and transmitting charging information received from the EV charging control apparatus according to a charging termination operation to the charging management server; and
a communication module receiving the charging information from the EV charging control apparatus through short-range wireless communication, and performing data transmission and reception with a mobile communication network to which the charging management server and the communication module are connected,
wherein the charging information includes billing information for an EV charging and the billing information is transferred by an in-vehicle telematics system (TMS) through the mobile communication network to the charging management server or an electric power company that determines a fee for the EV charging based on the amount of energy charged, and wherein the charging information includes identification information related to the EV, a charging start time, a charging end time, and the amount of energy charged.

14. The EV according to claim 13, wherein the communication module includes the in-vehicle telematics system.

15. The EV according to claim 13, wherein the communication module receives the charging information from the EV charging control apparatus using a wireless Local Area Network (WLAN) or a Bluetooth.

* * * * *